United States Patent
Waldschmidt et al.

(10) Patent No.: US 6,543,245 B1
(45) Date of Patent: Apr. 8, 2003

(54) MULTI-TEMPERATURE COLD PLATE REFRIGERATION SYSTEM

(75) Inventors: John Elliott Waldschmidt, New Market, MN (US); William Leo Waldschmidt, Farmington, MN (US)

(73) Assignee: Thermo King Corporation, Minneapolis, MN (US)

(*) Notice: Subject to any disclaimer, the term of this patent is extended or adjusted under 35 U.S.C. 154(b) by 0 days.

(21) Appl. No.: 10/005,661

(22) Filed: Nov. 8, 2001

(51) Int. Cl.$^7$ ................................................. B60H 1/32
(52) U.S. Cl. .............................. 62/239; 62/59; 62/199; 62/200
(58) Field of Search ..................... 62/239, 59, 199, 62/200, 431, 432

(56) References Cited

U.S. PATENT DOCUMENTS

| | | | |
|---|---|---|---|
| 2,479,848 A | 8/1949 | Mackey et al. | |
| 3,006,167 A | 10/1961 | Lorch | |
| 3,181,310 A | 5/1965 | Ammons | |
| 4,531,377 A | 7/1985 | Zajic | |
| 4,531,573 A | 7/1985 | Clark et al. | |
| 4,549,404 A | 10/1985 | Lord | |
| 4,553,403 A | 11/1985 | Taylor | |
| 4,565,071 A | 1/1986 | Bartling et al. | |
| 4,712,387 A * | 12/1987 | James et al. | 62/434 |
| 4,726,196 A | 2/1988 | Zajic | |
| 4,744,225 A | 5/1988 | Shoji et al. | |
| 4,748,823 A | 6/1988 | Asano et al. | |
| 4,756,164 A * | 7/1988 | James et al. | 62/119 |
| 4,800,733 A | 1/1989 | Strobel et al. | |
| 4,862,707 A | 9/1989 | Hill et al. | |
| 4,905,476 A * | 3/1990 | Cinacchi | 62/198 |
| 4,934,390 A | 6/1990 | Sapp | |
| 5,044,168 A * | 9/1991 | Wycoff | 62/126 |
| 5,054,295 A | 10/1991 | Goulooze | |
| 5,129,235 A | 7/1992 | Renken et al. | |
| 5,161,848 A | 11/1992 | Lutton | |
| 5,187,945 A | 2/1993 | Dixon | |
| 5,239,839 A * | 8/1993 | James | 62/434 |
| 5,319,941 A | 6/1994 | Schilling | |
| 5,407,002 A | 4/1995 | Voll | |
| 5,524,453 A * | 6/1996 | James | 62/434 |
| 5,673,567 A * | 10/1997 | Dube | 62/117 |
| 5,694,782 A * | 12/1997 | Alsenz | 62/156 |
| 5,704,676 A | 1/1998 | Hill | |
| 5,830,057 A | 11/1998 | Hunt, Jr. | |
| 5,875,638 A | 3/1999 | Tinsler | |
| 5,910,159 A * | 6/1999 | Matsuo et al. | 62/239 |
| 5,946,933 A | 9/1999 | Clarke et al. | |
| 6,067,815 A | 5/2000 | James | |
| 6,138,466 A * | 10/2000 | Lake et al. | 429/62 |
| 6,141,977 A * | 11/2000 | Zugibe | 62/125 |
| 6,161,394 A * | 12/2000 | Alsenz | 165/110 |
| 6,253,563 B1 * | 7/2001 | Ewert et al. | 62/59 |
| 6,253,567 B1 * | 7/2001 | Imanari et al. | 62/59 |

* cited by examiner

Primary Examiner—William E. Tapolcai
Assistant Examiner—Mohammad M. Ali
(74) Attorney, Agent, or Firm—Michael Best & Friedrich LLP

(57) ABSTRACT

A system and method of maintaining multiple temperatures using a single refrigeration system. A single refrigeration system includes a compressor, reservoir, condenser and associated piping is selectively coupled to one of a plurality of evaporator units. Each evaporator unit has an inlet valve, an expansion valve and an evaporator. A sensor signals a microprocessor that one of the plurality of evaporators requires cooling, initiating a cooling cycle. The compressor is energized and the evaporator inlet valve opens, allowing refrigerant to flow through the evaporator unit. At the conclusion of the cooling cycle, the evaporator inlet valve closes while the compressor continues to operate allowing the removal or drawing down of the refrigerant from the evaporator prior to cooling another evaporator section. At the conclusion of the draw down process, the compressor is de-energized.

16 Claims, 4 Drawing Sheets

MULTI-TEMPERATURE COLD PLATE REFRIGERATION SYSTEM

FIELD OF THE INVENTION

The present invention relates to refrigeration systems utilizing eutectic cold plates and more specifically to multi-temperature refrigeration systems utilizing eutectic cold plates in a refrigerated transport system.

BACKGROUND OF THE INVENTION

Current refrigeration units for use on transport vehicles in which multiple temperatures are required are typically designed in one of two ways. First, two separate refrigeration systems can be used. This requires two compressors, two control systems, two reservoirs and two refrigerant charges. Second, a single refrigeration system can be used with the multi-temperature zones connected in series thereby allowing both zones to be cooled simultaneously.

Many problems exist with these two designs. If two separate refrigeration systems are employed, twice the refrigerant will be necessary. Refrigerant can be expensive, and it is therefore desirable to reduce to a minimum the total refrigerant needed. Further, the use of two systems increases the overall cost of the system by requiring duplications of equipment such as compressors, reservoirs, and condensers. Additionally, the additional maintenance and potential for refrigerant leakage is increased with multiple systems.

If the series design is utilized, the system will likely require a larger compressor due to the extended piping and associated pressure drops. Additionally, if only one zone requires cooling, both are cooled thereby unnecessarily increasing the work load on the system. It is therefore desirable to cool two or more areas using a single refrigeration system having multiple evaporators while avoiding the problem of unnecessarily cooling one area when only the other area requires cooling.

SUMMARY OF THE INVENTION

This invention provides a multi-temperature refrigeration system having a single refrigeration unit consisting of a compressor, a condenser, a reservoir, a plurality of valves, and piping, selectively coupled to one of at least two evaporators and expansion devices.

The valves are configured so that refrigerant can be provided to either of the evaporators in order to cool each evaporator independent of either of the evaporator(s). After sufficient cooling (e.g. after an associated cold plate is frozen), the refrigerant is pumped out of (i.e. drawn down from) that evaporator in preparation for providing refrigerant to other evaporators when needed. More specifically, when an evaporator requires cooling, the valves are configured such that the refrigeration system is coupled to that evaporator allowing refrigerant flow from the reservoir into the evaporator. Once sufficient cooling has occurred, the valves are reconfigured to allow the compressor to draw down refrigerant from the evaporator. The compressor continues to run until a predetermined pressure within the evaporator is reached. At this point the compressor is de-energized and the valves are configured such that flow is prevented. A microprocessor control is programmed to operate the valves and the compressor to maintain the desired state of cooling within the multi-temperature zones.

DETAILED DESCRIPTION OF THE PREFERRED EMBODIMENTS

Figure 1:
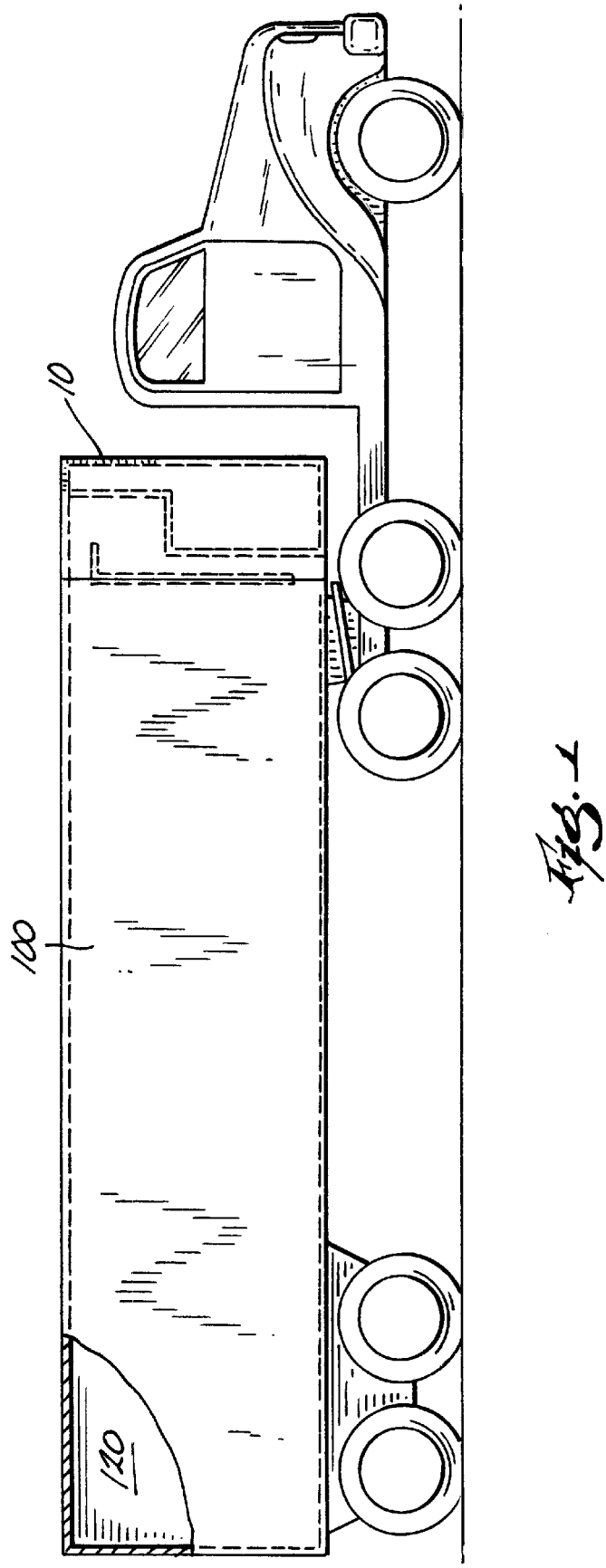
FIG. 1 is an illustration of the refrigerator unit installed on an over the road truck.
Figure 2:
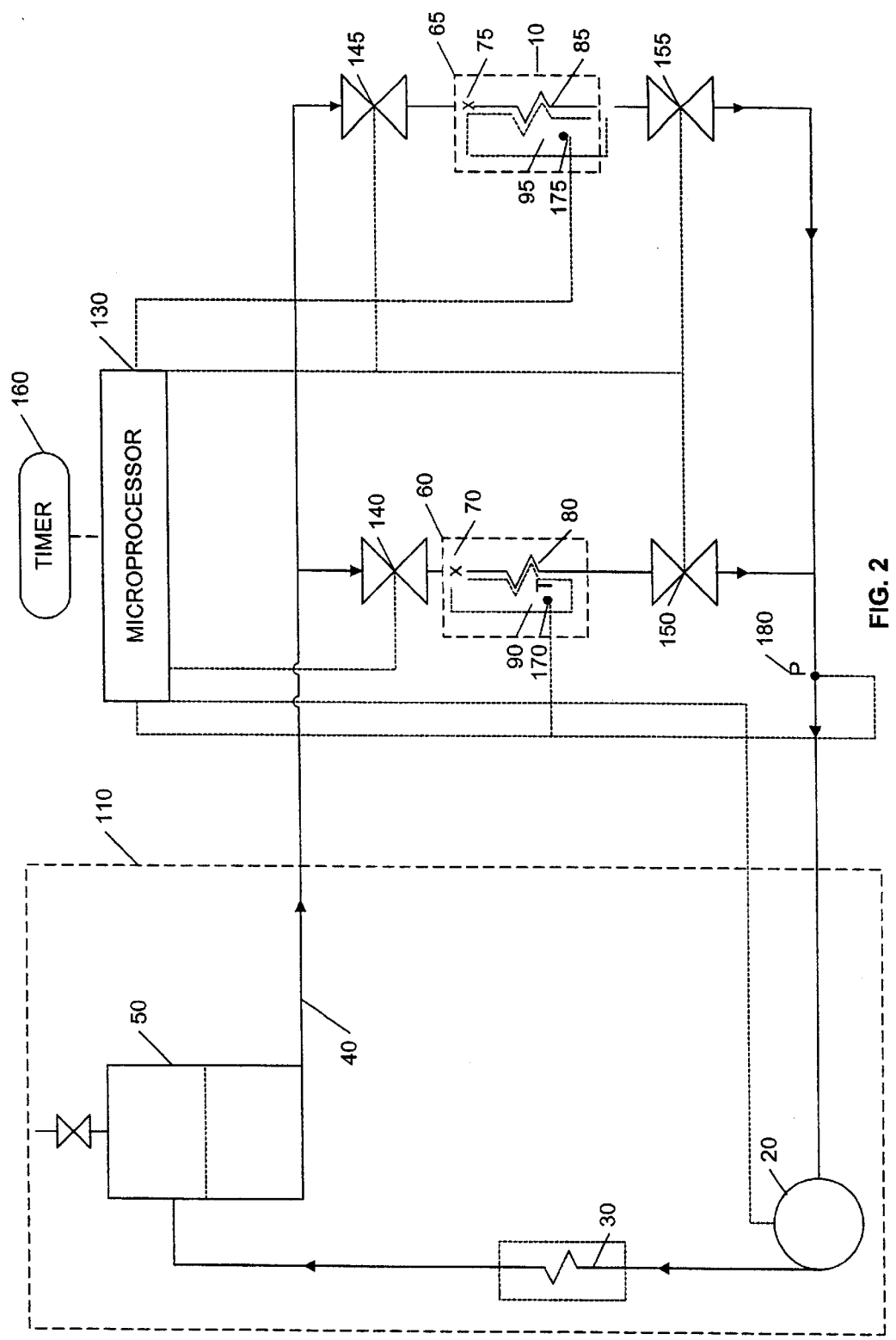
FIG. 2 is a schematic representation of an embodiment of the multi-temperature cold plate.

The refrigeration system 10 shown schematically in FIG. 2 includes a compressor 20, a condenser 30, piping 40, a reservoir 50, and a plurality of valves. Each evaporator unit 60,65 of the illustrated cooling system includes an expansion device 70,75, an evaporator 80,85, and a eutectic cold plate 90, 95. While FIG. 2 shows two evaporator units 60,65, it is contemplated that any number of units could be maintained at different temperatures using this system. The only limitation to the number of units to be cooled is the physical size of the trailer or room in which the system is installed. In addition, the use of a cold plate is not required. An evaporator could be used, without an adjacent cold plate, to directly cool the air within the refrigerated area with or without the aid of evaporator fans.

For purposes of this description, the term "refrigeration unit" will be used to describe the typical components of a refrigeration system without an evaporator and expansion valve. Therefore, a refrigeration unit 110 will typically contain a compressor 20, a condenser 30, a reservoir 50 and any necessary valves and pipes. In order for the refrigeration unit 110 to cool, it is coupled to one of a plurality of evaporator units 60,65. Unless otherwise stated, the evaporator unit 60,65 is assumed to contain an expansion device 70,75 at its refrigerant inlet for controlling the flow and pressure of refrigerant into the evaporator 80,85. The term refrigerant may include any common substance that is used for the purpose of cooling. Refrigerant would include, ammonia, R-12, freon, etc.

Referring again to FIG. 2, the system includes a refrigeration unit 110, a first evaporator unit 60, and a second evaporator unit 65. It is contemplated that each evaporator section 80, 85 would be maintained at different temperatures. For example, the first evaporator 80 could be maintained at 0° F. and the second evaporator 85 could be maintained at 45° F. In addition, the temperatures could be reversed, the first evaporator 80 could be maintained at 45° F. and the second evaporator 85 could be maintained at 0° F. There is no requirement that the first evaporator 80 be warmer or cooler than the second evaporator 85. In addition, the temperatures described are for illustrative purposes, and any temperature can be maintained. While it is contemplated that the evaporators 80,85 would be maintained at different temperatures, it is possible to configure the system such that the evaporators 80, 85 maintain the same temperature. This may be useful for transporting large loads requiring only one temperature.

The first and second evaporators 80,85 in the illustrated embodiment are located in close proximity to eutectic cold plates 90,95 to maintain the temperature within each unit. The illustrated evaporators 80,85 are a series of tubes located either within the cold plates 90, 95, within recesses in the cold plates 90, 95, or near the cold plates 90, 95 to allow the evaporator 80, 85 to remove heat from the cold plate 90, 95 which in turn provides cooling to the cold space 120. The eutectic cold plates 90, 95 are containers filled with a material such as an aqueous solution of water and sodium chloride (NaCl). The evaporator 80, 85 cools the eutectic cold plates 90, 95 until they are frozen, allowing them to maintain the temperature within the cold space 120 as the frozen mixture melts. Typically, the eutectic cold plates 90, 95 are sub-cooled, that is, cooled to a temperature below their actual freezing point. In a standard system, 10° F. to 15° F. of sub-cooling would be desirable. Many materials can be used to fill the eutectic cold plates 90, 95 allowing for a vast range of freezing temperatures to be maintained. The use of eutectic cold plates 90, 95 is well known to those skilled in the art of refrigeration as are the specific choices of eutectic cold plate materials that are available.

Referring again to the schematic representation of the preferred embodiment shown in FIG. 2, the refrigeration unit 110 contains a reservoir 50, a condenser unit 30 and a compressor 20. The compressor 20 is of standard design common in the art of refrigeration systems. In the illustrated embodiment, a hermetically sealed scroll compressor 20 is utilized. The compressor 20 is controlled by a programmed microprocessor 130 also common in industry. When compressor operation is desired, the microprocessor 130 sends a signal that allows the compressor 20 to energize. During operation, the compressor inlet takes in refrigerant vapor that has passed through one of the evaporator sections 60, 65. The compressor 20 increases the refrigerant pressure, the refrigerant exits the compressor and flows to the condenser unit 30. The illustrated condenser unit 30 is a standard condenser common in the art of refrigeration comprised of several tubes and an air moving apparatus to remove excess heat. The refrigerant flows through the condenser unit 30 where it is cooled and condenses to liquid form. The air moving apparatus is typically one or more fans, capable of moving sufficient air over the tubes to extract the desired amount of heat from the refrigerant. However, on a moving vehicle, the condenser may simply be exposed to the moving air stream allowing for efficient heat transfer. The liquid refrigerant then flows to a reservoir 50 where it is stored until needed. Again, the reservoir 50, like the compressor 20 and the condenser unit 30, is a component common in the art of refrigeration.

Figure 4:
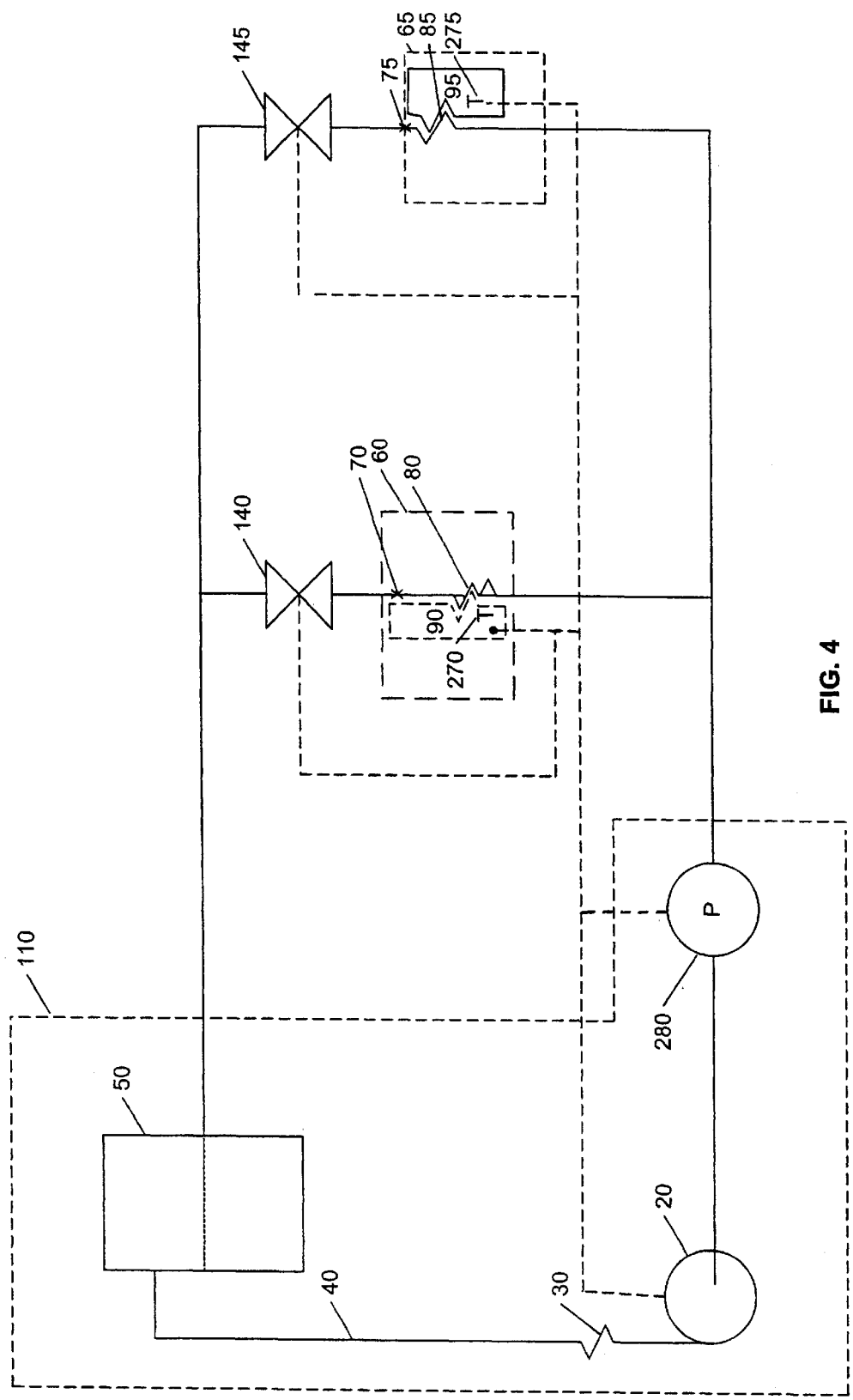
FIG. 4 is a schematic representation of a second embodiment of the multi-temperature cold plate.

While the preferred embodiment utilizes a microprocessor 130 to control the refrigeration system, another embodiment, illustrated in FIG. 4, requires no microprocessor. In this embodiment, temperature switches 270, 275 sense the cold plate temperature, energizing and de-energizing the compressor 20 when necessary for each cold plate 90, 95. For example, a temperature switch 270 in the first evaporator unit 60, upon sensing a high temperature, would energize the compressor 20 and open the inlet valve 70. When sufficient cooling has occurred, the switch 270 closes the inlet valve 70. The compressor 20 continues to operate until a low pressure switch 280 on the inlet side of the compressor indicates that sufficient refrigerant draw down has occurred. The switch then de-energizes the condenser 20.

In order for a single refrigeration unit 110 to provide cooling to multiple evaporator units 60, 65, the refrigeration unit 110 must be coupled to at least one of the more than two available evaporator units 60, 65. In the preferred embodiment, each evaporator unit 60, 65 has an inlet valve 140, 145 controlled by the microprocessor 130. An outlet check valve 150, 155 can be employed at the exit of each evaporator 80, 85 to prevent flow into that evaporator 80, 85 while another evaporator 80, 85 is being cooled. Alternatively, a check valve can be employed within the compressor 20 to prevent flow through the compressor 20 in the reverse direction when the compressor 20 is idle. Yet another alternative would be to choose a compressor 20 that will not allow reverse flow when it is idle. The inlet valves 140, 145 are connected to the outlet of the refrigeration unit 110 in a parallel relationship allowing refrigerant flow through any evaporator 80, 85 which has an open inlet valve 140, 145. The outlet check valves 150, 155, if employed, are arranged to allow flow out of the evaporator 80, 85 and back to the compressor 20 but to prevent flow in the opposite direction. The microprocessor 130 is programmed to open a single inlet valve 140, 145 in response to a need for cooling. In an embodiment having several evaporator units 60, 65, the microprocessor 130 may be programmed to open a percentage of the valves 140, 145 to cool several evaporator units 60, 65 simultaneously. Each evaporator unit 60, 65 of the preferred embodiment includes two valves: an inlet valve 140, 145, and an expansion device or expansion valve 70, 75. Other embodiments may include a third outlet check valve 150, 155.

An expansion valve 70, 75 is located at the inlet side of each evaporator 80, 85. The expansion valve 70, 75 can be a valve having a variable opening controlled by the microprocessor 130 or it can be a valve having a fixed opening. In one embodiment, the inlet valve 140, 145 also acts as an expansion device eliminating the need for an additional component. In addition, an expansion valve 70, 75 could be a simple tube that creates a sizable flow restriction. The liquid refrigerant at the inlet side of the valve is at a high pressure while the outlet side of the valve is at a low pressure. The refrigerant passes through the valve 70, 75, to the low pressure region where it vaporizes and cools.

The inlet valve 140, 145 in the preferred embodiment is a liquid line solenoid valve. However, check valves or other valves that the microprocessor 130 can control could also be utilized. The inlet valve 140, 145, when closed, isolates the inlet of the evaporator 80, 85 preventing refrigerant from flowing into the evaporator unit 60, 65.

The outlet valve 150, 155, if employed, is used to prevent refrigerant vapor from flowing back into the evaporator 80, 85 (e.g. out of one evaporator outlet into another evaporator outlet). A solenoid operated valve could be utilized, however a simple check valve could also be used. The check valve is oriented such that refrigerant is free to leave the evaporator 80, 85 and flow toward the compressor 20 but flow towards the evaporator 80, 85 is prevented. During compressor operation, the compressor side of the valve has a lower pressure than the evaporator side, allowing the valve to open. When the compressor 20 is de-energized, the valve 150, 155 closes preventing reverse flow of refrigerant. In another embodiment, the outlet check valves 150, 155 are combined into one check valve within the compressor 20 or the immediate compressor piping. The check valve prevents reverse flow of refrigerant when the compressor 20 is idle. In still another embodiment, the compressor 20 itself prevents reverse flow of refrigerant and no valve is required.

For purposes of description, the cooling cycle of a single evaporator unit will be discussed. It is understood that the following sequence of events can occur for any evaporator unit 60, 65 in the system or for multiple units simultaneously in a system having several evaporator units 60, 65.

Figure 3:
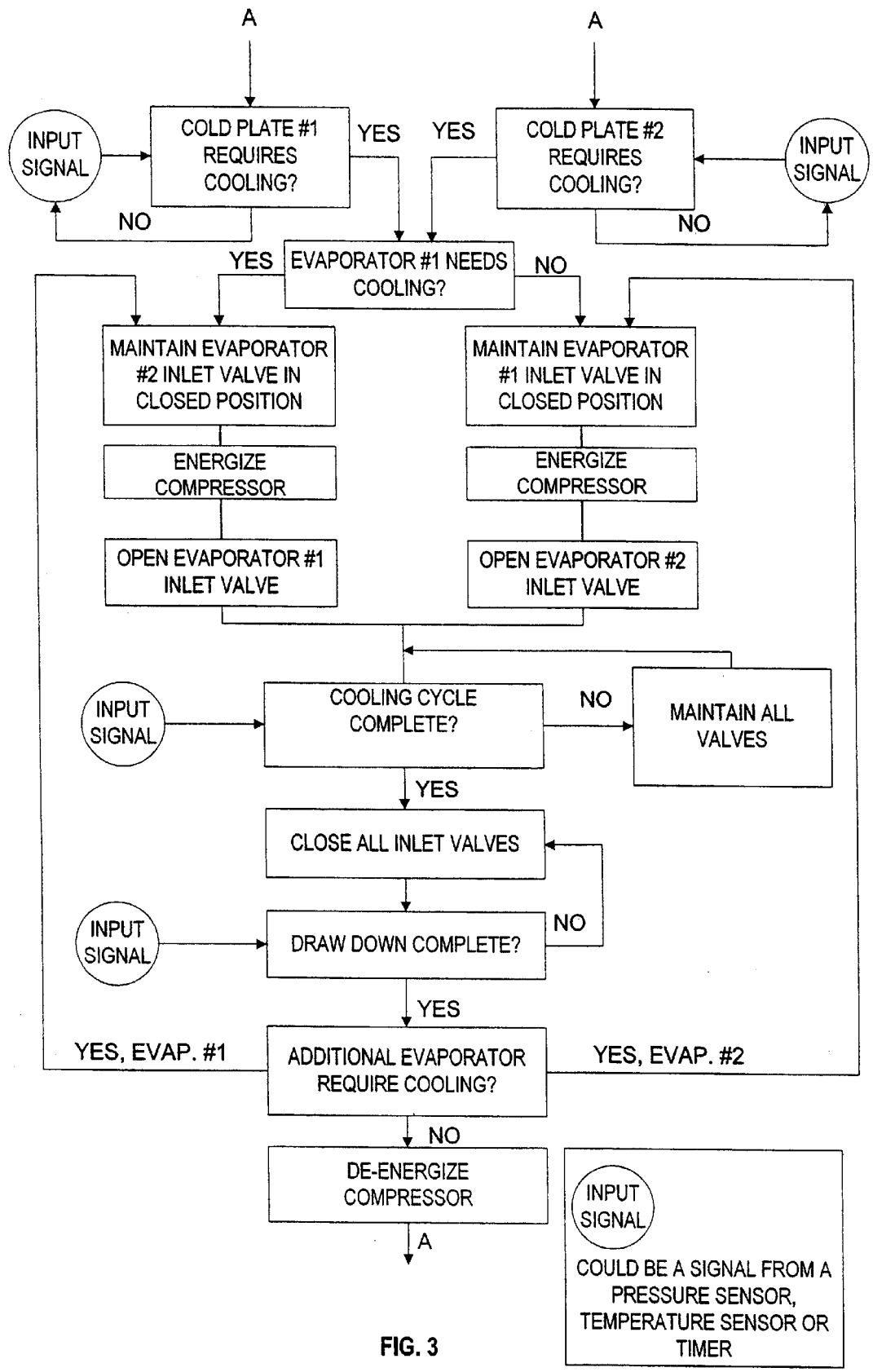
FIG. 3 is a flow chart illustrating the operation of one embodiment of the invention.

Referring to FIG. 3, a cooling cycle is initiated by the microprocessor 130 in response to a signal from a timer or sensor 160, 170, 175. In the preferred embodiment, a timer 160 is utilized to initiate periodic cooling cycles. The timer 160 utilizes a manually preset duration or a variable duration which is varied based on a variety of inputs such as desired temperature and ambient air temperature. In other embodiments, the system includes one or more temperature sensors 170, 175 that monitor the temperature of the cargo space 120 or the cold plate 90, 95 and send a signal to the microprocessor 130 when cooling is needed. The microprocessor 130 interprets the signal and is programmed to initiate a cooling cycle when the signal reaches a certain preprogrammed value. Many different sensors could be used to detect the need for cooling, including pressure sensors and temperature sensors. For example, a thermocouple could be used to directly measure the temperature of the cold plate 90, 95. Once the measured value (e.g. temperature or pressure) reaches a preprogrammed value, the microprocessor 130 initiates a cooling cycle.

Following the initiation of a cooling cycle, the compressor 20 is energized. Energizing the compressor 20 prior to opening any inlet valves 140, 145 assures that the compressor will start without any liquid refrigerant entering the compressor inlet. The evaporator unit 60 inlet valve 140 is opened allowing flow of refrigerant. Liquid refrigerant exits the reservoir 50 and flows through the inlet valve 140 to the expansion valve 70. The expansion valve 70 controls the refrigerant flow, creating a large drop in pressure, causing the refrigerant to vaporize. The refrigerant vapor flows into the evaporator section 60 where heat is extracted from the cold plate 90. The vapor then flows through the outlet valve 150, if present, and back to the compressor 20.

In the preferred embodiment, a pressure switch 180 is used to signal that the cooling cycle is complete. Pressure is measured on the inlet side of the compressor, the lower the pressure, the colder the cold plate 90. When the pressure reaches a predetermined level, the pressure switch 180 sends a signal to the microprocessor 130, ending the cooling cycle. In another embodiment a timer 160 controls the duration of the cooling cycle using either a manually preset duration or a variable duration. The variable duration being a function of any number of inputs such as desired freezing temperature, ambient air temperature, and cargo space temperature. In still another embodiment a temperature sensor 170 is used to measure the temperature of the cold plate 90. As the cold plate 90 freezes, the temperature will remain constant, however it is contemplated that some sub-cooling will be desired. Therefore, the temperature sensor 170 will end the cooling cycle when a predetermined amount of sub-cooling has occurred. Following the cooling cycle, the microprocessor 130 will close the inlet valve 140 initiating the draw down process.

During the draw down process, the inlet valve 140 is closed preventing refrigerant from entering the evaporator unit 60. The compressor 20 however, will continue to operate, removing refrigerant from the evaporator 60. When a sufficient duration has passed or the sensor 180 detects a sufficient pressure drop, the compressor 20 will de-energize and any outlet valves 10 present will close preventing reverse flow of the refrigerant.

The draw down process allows the refrigeration system 10 to use a smaller amount of refrigerant than would otherwise be required. A majority of the refrigerant used in the cooling process is removed from the evaporator 80, 85 and stored in the reservoir 50. The system thus requires only enough refrigerant to cool one evaporator 80, 85 in the case of the illustrated embodiment. In another embodiment having several cold plates 90, 95, refrigerant sufficient to cool only a percentage of the evaporators 80, 85 is required. In addition, using a draw down process in conjunction with limiting the number of evaporators 80, 85 that can be cooled simultaneously allows for a smaller refrigeration unit. For example, in the embodiment of FIG. 2, only one evaporator 80, 85 can be cooled at any given time. This allows for the design of the compressor 20, condenser 30, reservoir 50, and associated piping to be only large enough to support a single evaporator 80, 85. The smaller size translates into a more efficient cooling unit, and smaller space requirements.

Following the cooling cycle to one evaporator 80, 85, the cooling cycle could automatically be initiated for the other evaporator units 60, 65. In one embodiment, any evaporator unit 60, 65 can initiate a cooling cycle. Once initiated, all evaporator units 60, 65 are cooled in a pre-selected sequential order. In another embodiment, only the evaporator unit 60, 65 that signals a need for cooling will be cooled. In yet another embodiment, the cooling cycles are initiated based on a timer 160. The timer 160 is preset to initiate a cooling cycle after a certain time period has passed. The certain time period can be fixed or can be a function of many variables including the ambient air temperature.

The microprocessor 130 is used to operate the valves to allow for the selective cooling of any cold plate 90, 95, the selective drawing down of the corresponding evaporator 80, 85, and the shutting down of the system. A standard preprogrammed microprocessor can be utilized for this purpose. The microprocessor 130 receives signals from the evaporator sensors 170, 175 or the timers 160 and, based on this input, configures the valves for selectively cooling one or more evaporator units 60, 65 and selectively energizes or de-energizes the compressor 20. In the preferred embodiment, a timer 160 is utilized to determine when a cooling cycle is required, when the cycle is complete, and when the draw down process is complete. In another embodiment, a pressure sensor 180 detects a rise in the pressure within the idle evaporator 80, 85 as the cold plate warms 90, 95. At a preprogrammed point, the microprocessor 130 initiates a cooling cycle, cooling the cold plate 90, 95 and then closing the inlet valve 140, 145 allowing the draw down process to complete. In yet another embodiment, cold plate temperature is monitored. As the cold plate 90, 95 warms, its temperature will rise until it reaches the cold plate freezing point, at which point the temperature will stabilize. The microprocessor 130 is programmed to initiate a cooling cycle when the temperature of the cold plate 90, 95 reaches a predetermined value. Alternatively, the microprocessor 130 is programmed to initiate a cooling cycle when it detects a zero rate of temperature change at which time the cold plate 90, 95 will be melting. The cooling cycle, once initiated, will operate until the desired cold plate temperature is reached.

Although particular embodiments of the present invention have been shown and described, other alternative embodiments will be apparent to those skilled in the art and are within the intended scope of the present invention. Thus, the present invention is to be limited only by the following claims.

What is claimed is:

1. A multi-temperature refrigeration system comprising:
    a refrigeration unit having: a compressor, a condenser, and a reservoir;
        a plurality of evaporator units fluidly coupled to the compressor, each evaporator unit having an inlet valve, a cold plate housing a eutectic material, the eutectic material having a preferred temperature range, an expansion device, an evaporator adjacent the cold plate and operable to selectively cool the cold plate, and a temperature sensor thermally coupled to the cold plate for detecting cold plate temperature; and
        a microprocessor in communication with the temperature sensors and programmed to selectively energize or de-energize the compressor, and to selectively open at least one inlet valve while maintaining the remainder of the inlet valves in the closed position when the at least one temperature sensor records a temperature above the desired temperature range.

2. The multi-temperature refrigeration system of claim 1, wherein each inlet valve is a solenoid operated valve.

3. The multi-temperature refrigeration system of claim 1, wherein the plurality of evaporator units includes a first cold plate having a first eutectic material and a cold plate having a second eutectic material.

4. The multi-temperature refrigeration system of claim 1, further comprising a timer mechanism having a cycle time, the mechanism coupled to the microprocessor to periodically initiate a cooling cycle.

5. The multi-temperature refrigeration system of claim 4, further comprising an ambient air temperature sensor coupled to the microprocessor varying the timer mechanism cycle time in response to ambient air temperature.

6. The multi-temperature refrigeration system of claim 1, further comprising at least one pressure sensor coupled to the plurality of evaporators and coupled to the microprocessor to terminate a cooling cycle.

7. The multi-temperature refrigeration system of claim 1, further comprising a plurality of cold plates thermally coupled to the plurality of evaporator units.

8. The multi-temperature refrigeration system of claim 1, wherein the expansion device and the inlet valve are one solenoid operated valve.

9. The multi-temperature refrigeration system of claim 1, wherein each of the plurality of evaporator units further comprise an outlet valve.

10. A multi-temperature refrigeration system comprising:
a compressor;
a first inlet valve;
a second inlet valve, the first and second inlet valves coupled to the compressor;
a first cold plate in thermal communication with the first load space and having a first temperature sensor;
a first evaporator coupled to the first inlet valve, the first evaporator being adjacent to the first cold plate and operable to selectively cool the first cold plate when the first temperature sensor records a temperature above a first temperature range;
a second cold plate in thermal communication with the second load space and having a second temperature sensor;
a second evaporator coupled to the second inlet valve, the second evaporator adjacent to the second cold plate and operable to selectively cool the second cold plate when the second temperature sensor records a temperature above a second temperature range; and
a microprocessor programmed to open one of the first inlet valve and the second inlet valve in response to a signal.

11. The multi-temperature refrigeration system of claim 10, wherein the first and second inlet valves comprise solenoid operated valves.

12. The multi-temperature refrigeration system of claim 10, further comprising a first outlet valve and a second outlet valve.

13. The multi-temperature refrigeration system of claim 12, wherein the first and second outlet valves are check valves.

14. The multi-temperature refrigeration system of claim 10, wherein the first cold plate has a first eutectic material and a second cold plate unit has a second eutectic material.

15. A multi-temperature refrigeration system comprising:
a refrigeration unit having: a compressor, a low pressure switch, a condenser, and a reservoir;
a plurality of evaporator units fluidly coupled to the compressor, each evaporator unit having an inlet valve, a cold plate housing a eutectic material having a preferred temperature range, a temperature switch, an expansion device and an evaporator adjacent to the cold plate and operable to selectively cool the cold plate;
wherein,
one of the plurality of temperature switches will energize the compressor, and will selectively open at least one inlet valve while maintaining the remainder of the inlet valves in the closed position when the temperature sensor records a temperature above the preferred temperature range, and the low pressure switch will de-energize the compressor.

16. The multi-temperature refrigeration system of claim 15, wherein the plurality of evaporator units includes a first cold plate having a first eutectic material and a cold plate having a second eutectic material.

* * * * *